(12) United States Patent
Zhang

(10) Patent No.: US 8,692,664 B2
(45) Date of Patent: Apr. 8, 2014

(54) ALARM REPORT METHOD, SYSTEM AND DEVICE FOR CASCADED EQUIPMENT

(75) Inventor: Panke Zhang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 13/258,210

(22) PCT Filed: Jul. 19, 2010

(86) PCT No.: PCT/CN2010/075258
§ 371 (c)(1),
(2), (4) Date: Apr. 18, 2012

(87) PCT Pub. No.: WO2011/050631
PCT Pub. Date: May 5, 2011

(65) Prior Publication Data
US 2012/0204084 A1    Aug. 9, 2012

(30) Foreign Application Priority Data

Oct. 28, 2009  (CN) .......................... 2009 1 0209154

(51) Int. Cl.
*G08B 1/00* (2006.01)
(52) U.S. Cl.
USPC .............................. 340/506; 340/3.1; 340/511
(58) Field of Classification Search
USPC .......................................... 340/506, 3.1, 511
See application file for complete search history.

(56) References Cited

U.S. PATENT DOCUMENTS 5,400,246 A * 3/1995 Wilson et al. ................... 700/17
2008/0008212 A1   1/2008 Wang et al.

FOREIGN PATENT DOCUMENTS

| CN | 101014173 A | 8/2007 |
|----|-------------|--------|
| CN | 101193409 A | 6/2008 |
| CN | 101695175 A | 4/2010 |
| JP | 2008099137 A | 4/2008 |
| JP | 2008516503 A | 5/2008 |
| JP | 2009147873 A | 7/2009 |
| JP | 2009284066 A | 12/2009 |
| JP | 2010171739 A | 8/2010 |
| WO | 2007130324 A2 | 11/2007 |

OTHER PUBLICATIONS

International Search Report on international application No. PCT/CN2010/075258, mailed on Oct. 28, 2010.
English Translation of the Written Opinion of the International Search Authority in international application No. PCT/CN2010/075258, mailed on Oct. 28, 2010.

* cited by examiner

*Primary Examiner* — Daryl Pope
(74) *Attorney, Agent, or Firm* — Oppedahl Patent Law Firm LLC

(57) ABSTRACT

The disclosure discloses an alarm report method for cascaded equipments, comprises: after receiving link alarm information, a radio equipment determines the source of the link alarm information; the radio equipment selects one link alarm information report mode from multiple predetermined link alarm information report modes according to the result of determining the source; the radio equipment reports the link alarm information to a Radio Equipment Controller (REC) according to the selected link alarm information report mode. The disclosure further discloses an alarm report system and device for cascaded equipments. The disclosure can effectively lower the alarm information processing complexity of an REC and the correlation of alarms.

14 Claims, 3 Drawing Sheets

US 8,692,664 B2

ALARM REPORT METHOD, SYSTEM AND DEVICE FOR CASCADED EQUIPMENT

TECHNICAL FIELD

The disclosure relates to the field of communications technology and particularly to an alarm report method, system and device for cascaded equipments.

BACKGROUND

Common Public Radio Interface (CPRI) is a standard published by a great many enterprises in the telecommunications industry together for standardizing the key interfaces between a Radio Equipment Control (REC) and a Radio Equipment (RE) inside a radio base station. On the basis of CPRI standard, the universality of the interfaces between a baseband unit and a radio frequency unit is improved, and it is advantageous to realize the interconnection of the baseband units and radio frequency units of different manufacturers. An REC is typically connected with REs is via optical fibers or cables in the shape of star, chain or ring and the like to form a network.

In FIG. 1, the REC refers to a near-end equipment, and each RE refers to a remote equipment. The REC and the RE mentioned here are respectively called a Build Baseband Unit (BBU) and Remote Radio Unit (RRU) in some systems. The port of the REC is a master port, the port of the RE which is close to the REC side is a slave port, and the port of the RE which is connected with an inferior RE is a master port.

In the case where equipments are cascaded into a network, the normal operating of a system will be influenced if a fault occurs in a physical link, therefore, alarm information is required to be reported fast and accurately so that a maintainer can treat as soon as possible.

At present, in a radio communication system, an alarm generated by a cascaded remote equipment, especially a bottom link alarm, is typically reported by a centralized report method in which all cascaded remote equipments report bottom link alarm information to a near-end equipment through a physical layer channel (layer L1), and then the near-end equipment processes in a uniform and centralized manner. This centralized report method, although extremely excellent in alarm information report speed, causes a lot of pressure for the near-end equipment to process the alarm information as the amount of the data need to be reported grows increasingly for more and more cascaded remote equipments are supported and alarm information is classified more detailedly. Taking a near-end equipment supportive to 10 ports as an example, if each port supports 16-cascade cascaded equipments at most, then the alarm information the near-end equipment needs to process are totally 320*n, wherein the n is the number of the alarms each port of remote equipment of each cascade needs to report. In this case, a great number of resources are wasted in a 16-cascade alarm information detection and report even in most cases there are only 2 or 3 cascade being used instead of 16 cascade. This undoubtedly severe resource waste is still generally companied with a cost increase.

FIG. 2 shows an existing centralized report solution for cascaded alarms in which the alarms ALARM_S generated by the slave port of each RE and ALARM_M generated by the master port of each RE are respectively reported through corresponding bit position of two control words. Each RE only fills bits the RE is corresponds to and transparently transmits the other bits. Taking 16-cascade which is supported as an example, an REC needs to analyze and process 32 alarm bits.

Besides, cascaded networking is featured in that if a cascaded link is broken or runs unstably, the information of all inferior cascades cannot be reported reliably, and that the problem existing in a superior cascade is generally required to be solved preferentially. In the case of a centralized alarm report, the processing on the correlation of alarms is relatively complicated as an alarm occurring in an inferior cascade is related with those of all the superior cascades, that is, the alarm reported by a cascade may be (pay attention: what is used here is 'may be') effective only if there is no alarm occurring in any superior cascade because the alarm on an link error of a physical layer channel cannot be extraordinarily strict in most cases. If an unstable link causes an intermittent alarm in a superior cascade, then, due to the difference in alarm processing time, the more complicated the correlation of alarms is, the more possibly an error alarm occurs in an inferior cascade.

In realizing the disclosure, the inventor finds that the prior art has the following technical problems:

In existing centralized alarm report mode for cascaded devices, a near-end equipment needs to process a large amount of reported alarm information, which causes a resource waste and a high processing complexity on the near-end equipment, besides, as it is complicated to process the correlation of alarms, the probability of an error alarm is relatively high.

SUMMARY

The disclosure provides an alarm report method, system and device for cascaded equipments, which are used for lowering the alarm information processing complexity of an REC and the correlation of alarms.

In order to achieve the object above, the technical solution of the disclosure is realized as follows:

An alarm report method for cascaded equipments, includes:

after receiving link alarm information, an RE determines a source of the link alarm information;

the RE selects one link alarm information report mode from multiple predetermined link alarm information report modes according to a result of determining the source; and the RE reports the link alarm information to an REC according to the selected link alarm information report mode.

The multiple link alarm information report modes may include:

the link alarm information is reported to the REC through a data link layer transmission channel or data network layer transmission channel with a data checking function; or the link alarm information is reported to the REC through a physical layer channel between the RE and the REC; or the link alarm information is reported to the REC through a superior RE cascaded with the RE.

The process that the RE selects a link alarm information report mode may includes:

selecting a link alarm information report mode in which the link alarm information is reported to the REC through a data link layer transmission channel or data network layer transmission channel with a data checking function in case that the source of the link alarm information is a master port of the RE or an inferior RE cascaded with the RE; or selecting a link alarm information report mode in which the link alarm information is reported to the REC through the superior RE cascaded with the RE or through the physical layer channel between the RE and the REC in case that the source of the link alarm information is a slave port of the RE.

Reporting the link alarm information to the REC through a superior RE cascaded with the RE may include:

sending, by the RE, the link alarm information to the master port of the superior RE cascaded with the RE;

reporting, after receiving the link alarm information by the master port of the superior RE, the link alarm information to the REC through the data link layer transmission channel or data network layer transmission channel with a data checking function.

Reporting the link alarm information to the REC through the data link layer transmission channel or data network layer transmission channel with a data checking function may include:

sending, by the RE, the link alarm information to the data link layer transmission channel or data network layer transmission channel;

performing, by the data link layer transmission channel or data network layer transmission channel, a Cyclic Redundancy Check (CRC) on the received link alarm information and sending the processed link alarm information to the REC; and performing, after receiving the link alarm information, a CRC on the link alarm information by the REC, and reporting the link alarm information to an Operation Maintenance Center (OMC) in case that the check is succeeded.

sending, by the RE, the link alarm information to the master port of the superior RE cascaded with the RE may include:

carrying, by the RE, the link alarm information in a control word defined by a Common Public Radio Interface (CPRI) and sending the control word to the master port of the superior RE cascaded with the RE;

the master port of the superior RE receives the link alarm information may includes:

obtaining, after receiving the control word by the master port of the superior RE, the link alarm information from the control word by analyzing the control word.

The data link layer transmission channel may include a High-Speed Data Link Control (HDLC) channel; and the data network layer transmission channel may include an Ethernet channel.

An alarm report system for cascaded equipments, includes an RE and an REC, wherein the RE cascaded with the REC is configured to determine a source of link alarm information after receiving the link alarm information, select one link alarm information report mode from multiple predetermined link alarm information report modes according to a result of determining the source, and report the link alarm information to the REC according to the selected link alarm information report mode.

When selecting one link alarm information report mode from multiple predetermined link alarm information report modes, the RE may be configured to:

select a link alarm information report mode in which the link alarm information is reported to the REC through a data link layer transmission channel or data network layer transmission channel with a data checking function in case that the source of the link alarm information is a master port of the RE or an inferior RE cascaded with the RE;

select a link alarm information report mode in which the link alarm information is reported to the REC through a superior RE cascaded with the RE or through a is physical layer channel between the RE and the REC in case that the source of the link alarm information is a slave port of the RE.

when selecting the link alarm information report mode in which the link alarm information is reported to the REC through the superior RE cascaded with the RE, the RE may be configured to:

send the link alarm information to the master port of the superior RE cascaded with the RE;

the superior RE is configured to:

report, after receiving the link alarm information through the master port of the superior RE, the link alarm information to the REC through the data link layer transmission channel or data network layer transmission channel with a data checking function.

When the link alarm information is reported to the REC through the data link layer transmission channel or data network layer transmission channel with a data checking function, the RE may be configured to:

send the link alarm information to the data link layer transmission channel or data network layer transmission channel;

the data link layer transmission channel or data network layer transmission channel may be configured to:

perform a CRC on the received link alarm information and send the processed link alarm information to the REC;

and the REC may be configured to:

perform, after receiving the link alarm information, a CRC on the link alarm information, and report the link alarm information to an OMC if the check is succeeded, or discard the link alarm information if the check is failed.

A radio equipment, includes:

an alarm receiving unit, which is configured to receive link alarm information;

a source determining unit, which is configured to determine a source of the link alarm information;

a report mode selecting unit, which is configured to select one link alarm information report mode from multiple predetermined link alarm information report modes according to a result of determining the source; and an alarm reporting unit, which is configured to report the link alarm information to an REC according to the link alarm information report mode selected by the report is mode selecting unit.

The report mode selecting unit may include:

a master port selecting unit, which is configured to select a link alarm information report mode in which the link alarm information is reported to the REC through a data link layer transmission channel or data network layer transmission channel with a data checking function in case that the source of the link alarm information is a master port of the RE or an inferior RE cascaded with the RE; and a slave port selecting unit, which is configured to select a link alarm information report mode in which the link alarm information is reported to the REC through a superior RE cascaded with the RE or through a physical layer channel between the RE and the REC in case that the source of the link alarm information is a slave port of the RE.

The alarm reporting unit may include a first reporting unit and/or a second reporting unit, wherein the first reporting unit may be configured to send the link alarm information to the master port of the superior RE cascaded with the RE through physical link layer transmission channel or data network layer transmission channel so as to instruct the master port of the superior RE to report the link alarm information to the REC through the data link layer transmission channel or data network layer transmission channel with a data checking function after receiving the link alarm information; and the second reporting unit may be configured to send the link alarm information to the data link layer transmission channel or data network layer transmission channel so as to instruct the data link layer transmission channel or data network layer transmission channel to perform a CRC on the received link alarm information and send the processed link alarm information to the REC.

In the disclosure, after receiving link alarm information, an RE determines the source of the link alarm information, selects one link alarm information report mode from multiple predetermined link alarm information report modes according to the result of determining the source, and reports the link alarm information to an REC according to the selected link alarm information report mode. It can be seen that instead of reporting all link alarm information to the REC through a physical layer channel, the RE can select multiple report modes to report link alarm information to the REC when receives link alarm information, therefore, the alarm information to be detected by the REC on a physical layer is effectively decreased, and the resource is waste and the processing complexity of the REC are consequentially reduced, besides, the link alarm information can be reported in different ways, therefore, the correlation between alarm information is reduced, and the probability of an error alarm is consequentially reduced.

DETAILED DESCRIPTION OF THE DISCLOSURE

In order to lower the resource waste and the processing complexity of a near-end device and the probability of the error alarm of an RE, the embodiment of the disclosure provides an alarm report method for cascaded equipments, in the method, after receiving link alarm information, an RE can select different link alarm information report modes according to the different sources of the link alarm information and report link alarm information to an REC according to the selected link alarm information report mode.

Figure 3:
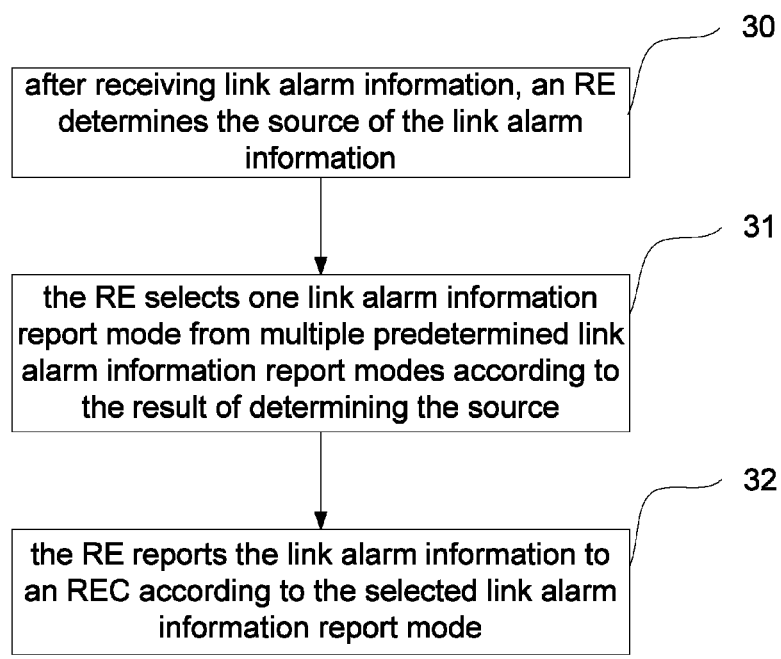
FIG. 3 is a schematic flowchart illustrating a method provided in an embodiment of the disclosure.
Figure 4:
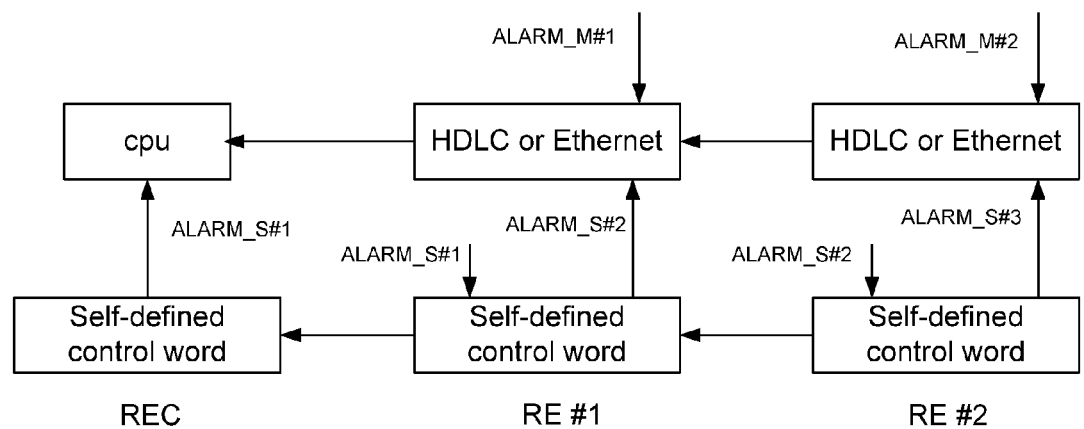
FIG. 4 is a schematic diagram illustrating the reporting of link alarm information by an RE according to an embodiment of the disclosure.

Referring to FIG. 3, the alarm report method for cascaded equipments provided in an embodiment of the disclosure specifically includes the following steps:

step 30: after receiving link alarm information, an RE determines the source of the link alarm information;

step 31: the RE selects one link alarm information report mode from multiple predetermined link alarm information report modes according to the result of is determining the source;

and step 32: the RE reports the link alarm information to an REC according to the selected link alarm information report mode.

In step 31, the multiple link alarm information report modes may be the following three modes:

mode 1, the link alarm information is reported to the REC through a data link layer transmission channel or data network layer transmission channel with a data checking function;

mode 2, the link alarm information is reported to the REC through a physical layer channel between the RE and the REC;

mode 3, the link alarm information is transmitted to a superior RE cascaded with the RE through a physical layer channel, and then the superior RE reports the link alarm information to the REC through a data link layer transmission channel or data network layer transmission channel.

Certainly, link alarm information report modes are not limited to those mentioned above, and any report mode except the mode in which link alarm information is reported using a link layer belongs to the protection scope of the disclosure.

Specifically, when selecting a link alarm information report mode according to the result of determining the source of the alarm information, the RE may select a link alarm information report mode according to the following ways:

when the source of the link alarm information is the master port of the RE or an inferior RE cascaded with the RE, selecting the link alarm information report mode of reporting the link alarm information to the REC through a data link layer transmission channel or data network layer transmission channel with a data checking function;

when the source of the link alarm information is the slave port of the RE, selecting the link alarm information report mode of reporting the link alarm information to the REC through a superior RE cascaded with the RE or through a physical layer channel between the RE and the REC. Specifically, when the source of the link alarm information is the slave port of the RE and the superior equipment cascaded with the RE is an REC, selecting the link alarm information report mode of reporting the link alarm information to the REC through a physical layer channel between the RE and the REC; when the source of the link alarm information is the slave port of the RE and the superior equipment cascaded with the RE is an REC, selecting the link alarm information report mode of reporting the link alarm information to the REC through the superior RE cascaded with the RE.

Certainly, the selection on a specific link alarm information report mode is not limited to the modes mentioned above and can be optionally made as needed.

Reporting the link alarm information to the REC through an superior RE cascaded with the RE is realized in the following way: the RE sends the link alarm information to the master port of the superior RE cascaded with the RE, and after receiving the link alarm information, the master port of the superior RE reports the link alarm information to the REC through a data link layer transmission channel or data network layer transmission channel with a data checking function or directly through a physical layer channel between the RE and the REC.

Reporting the link alarm information to the REC through a data link layer transmission channel or data network layer transmission channel with a data checking function is realized in the following way: the RE sends the link alarm information to the data link layer transmission channel or data network layer transmission channel; after receiving the link alarm information through the data link layer transmission channel or data network layer transmission channel, the REC performs a Cyclic Redundancy Check (CRC) (e.g. calculating the CRC checksum of the link alarm information and then adding the CRC checksum in the link alarm information) on the link alarm information, and sends the processed link alarm information to the REC; after receiving the link alarm information, the REC performs a CRC on the link alarm information, and then reports the link alarm information to an Operation Maintenance Center (OMC) if the check is succeeded, or discards the link alarm information if the check is failed.

When sending the link alarm information to the master port of the superior RE cascaded with the RE, the RE first may carry the link alarm information in a control word defined by a CPRI and then send the control word to the master port of the superior RE cascaded with the RE. After receiving the control word, the master port of the superior RE obtains the link alarm information by analyzing the control word.

The data link layer transmission channel of the disclosure includes but is not limited to an HDLC channel, and the data network layer transmission channel includes but is not limited to an Ethernet channel. The HDLC or Ethernet channel may be a channel defined in a CPRI frame structure and is still borne by cascaded optical fibers or cables in a physical layer.

The disclosure is described in detail below by reference to specific embodiments.

The embodiment is illustrated below based on an example of CPRI-interconnected systems.

Figure 1:
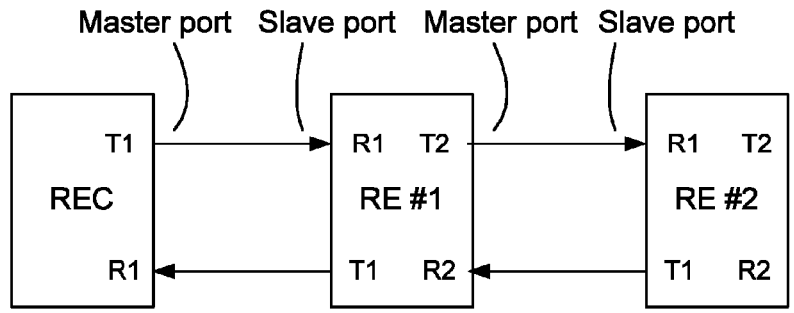
FIG. 1 is a schematic diagram illustrating an existing cascaded system consisting of an REC and REs.

In FIG. 1, the REC refers to a near-end equipment, and each RE refers to a remote equipment. The REC and the RE mentioned here are respectively called a Build Baseband Unit (BBU) and Remote Radio Unit (RRU) in some systems. The port of the REC is a master port, the port of each RE which is close to the REC is a slave port, and the port of the RE connected with an inferior RE is a master port.

Existing centralized report solution and the distributed report solution provided herein are described and compared below by taking the reporting of an error link check alarm by the master and the slave port of an RE as an example.

Figure 2:
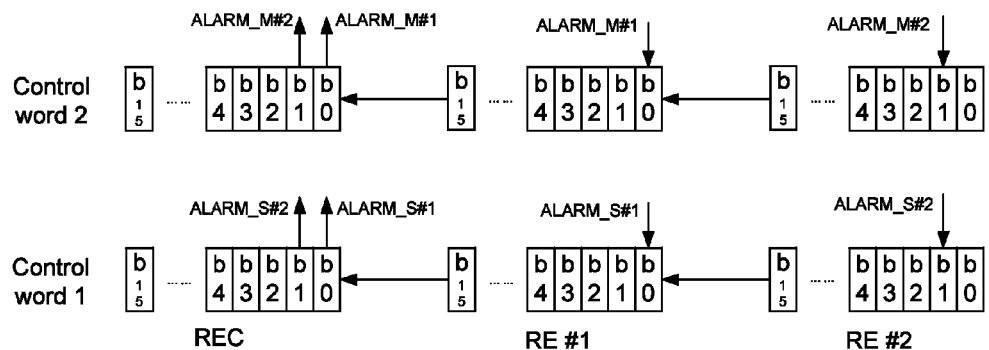
FIG. 2 is a schematic diagram illustrating the reporting of link alarm information by an RE in the prior art.

FIG. 2 shows an existing centralized report solution for cascaded alarms, in which the alarms ALARM_S and ALARM_M respectively generated by the slave port and the master port of each RE are respectively reported through corresponding bit position of two control words. Each RE only fills bits to which the RE corresponds and transparently transmits the other bits. Specifically, RE#1 reports, to an REC, an alarm (ALARM_S#1) generated by the slave port thereof through the bit position b0 of control word 1, RE#1 reports, to an REC, an alarm (ALARM_M#1) generated by the master port thereof through the bit position b0 of control word 2, and RE#2 reports, to the REC, an alarm (ALARM_S#2) generated by the slave port thereof through the bit position b1 of control word 1, RE#2 reports, to an REC, an alarm (ALARM_M#2) generated by the master port thereof through the bit position b1 of control word 2. The REC analyzes each bit of the two control words to determine the cascade where an alarm occurs. Taking 16-cascade which is supported as an example, an REC needs to analyze and process 32 alarm bits.

FIG. 3 shows a distributed report solution for cascaded alarms provided in the disclosure, this type of alarm occupies 1 control word. Taking RE#1 as an example, the alarm (ALARM_S#1) of the slave port of RE#1 is transmitted to a superior cascade through a control word, and the alarm (ALARM_M#1) of the master port of RE#1 and the alarm (ALARM_S#2) of the slave port of an inferior RE#2 analyzed from the control word of the master port are reported through an HDLC or Ethernet. For RE#2, the alarm (ALARM_S#2) of the slave port of RE#2 is transmitted to an superior cascade through a control word, and the alarm (ALARM_M#2) of the master port of RE#2 and the alarm (ALARM_S#3) of the slave port of an inferior RE#3 is analyzed from the control word of the master port are reported through an HDLC or Ethernet. Still taking 16-cascade which is supported as an example, the bottom CPRI of the REC only needs to analyze 1 alarm bit. No extra resource is added for transmitting the alarm information as HDLC and Ethernet are existing fixed channels. Additionally, due to the use of existing CRC and retransmission function in case of an error, processing alarm reporting through the HDLC or Ethernet makes the alarm information reported more reliable.

Figure 5:
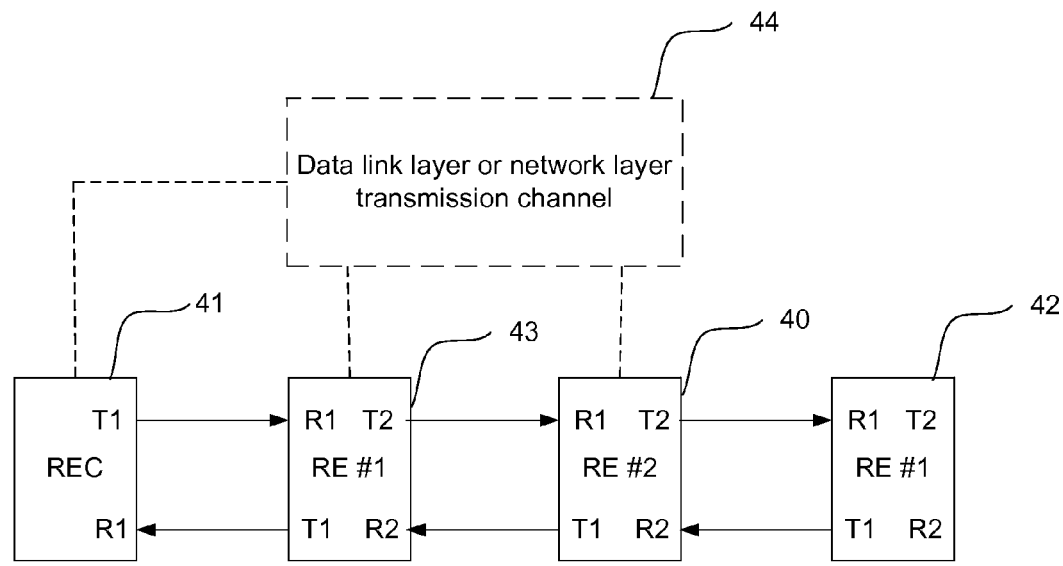
FIG. 5 is a schematic diagram illustrating the structure of a system provided in an embodiment of the disclosure.

Referring to FIG. 5, the embodiment of the disclosure further provides an alarm report system for cascaded equipments, the system includes:

a radio equipment (RE) 40, which is cascaded with an REC and is configured to determine the source of the link alarm information after receiving the link alarm information, select one link alarm information report mode from multiple predetermined link alarm information report modes according to the result of determining the source, and report the link alarm information to the REC according to the selected link alarm information report mode;

and an REC 41 for receiving the link alarm information.

The RE 40 is configured to:

select a link alarm information report mode in which the link alarm information is reported to the REC through a data link layer transmission channel or data network layer transmission channel 43 with a data checking function when the source of the link alarm information is the master port of the RE or an inferior RE 42 cascaded with the RE;

or select a link alarm information report mode in which the link alarm information is reported to the REC through a superior RE 44 cascaded with the RE or through a physical layer channel between the RE and the REC when the source of the link alarm information is the slave port of the RE.

The RE 40 is configured to:

send the link alarm information to the master port of an superior RE cascaded with the RE;

correspondingly, the superior RE 44 is configured to:

report, after receiving the link alarm information by the master port thereof, the link alarm information to the REC through a data link layer transmission channel or data network layer transmission channel with a data checking function.

The RE 40 is configured to:

send the link alarm information to the data link layer transmission channel or data network layer transmission channel;

correspondingly, the data link layer transmission channel or data network layer transmission channel 43 is used for:

performing a CRC on the received link alarm information and sending the processed link alarm information to the REC, and the REC is configured to:

perform a CRC on the link alarm information after receiving the link alarm information, and report the link alarm information to an OMC if the check is succeeded, or discard the link alarm information if the check is failed.

The RE 40 is configured to:

carry the link alarm information in a control word defined by a CPRI and send the control word to the master port of an superior RE cascaded with the RE;

correspondingly, the superior RE 44 is configured to:

obtain the link alarm information from the control word by analyzing the control word after receiving the control word by the master port of the superior RE.

Figure 6:
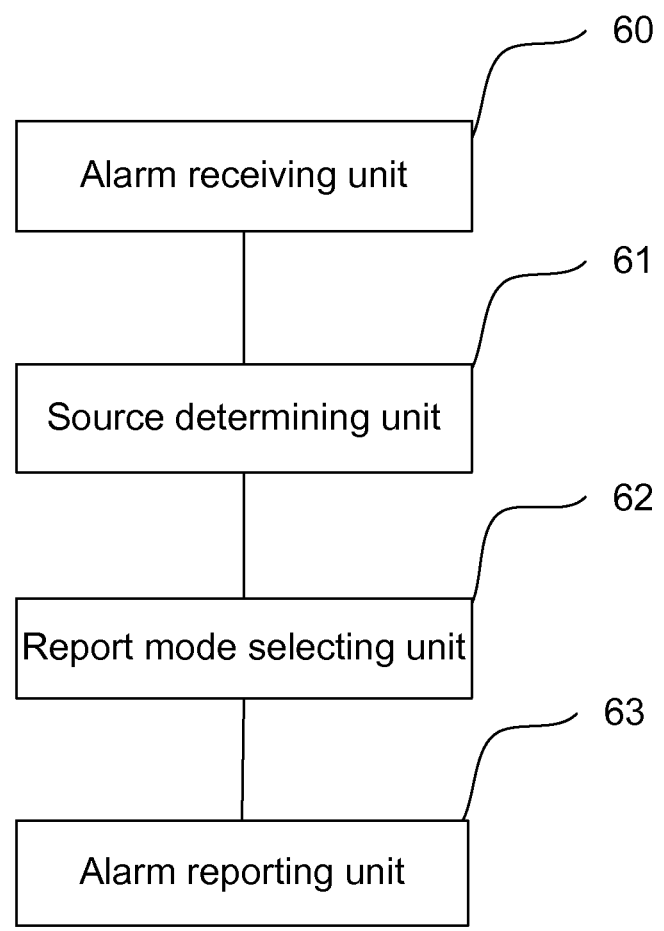
FIG. 6 is a schematic diagram illustrating the structure of a device provided in an embodiment of the disclosure.

Referring to FIG. 6, there is further provided a radio equipment in an embodiment of the disclosure, which includes:

an alarm receiving unit 60 for receiving link alarm information;

a source determining unit 61 for determining the source of the link alarm information;

a report mode selecting unit 62 for selecting one link alarm information report mode from multiple predetermined link alarm information report modes according to the result of determining the source;

and an alarm reporting unit 63 for reporting the link alarm information to an REC according to the link alarm information report mode selected by the report mode selecting unit.

The report mode selecting unit 62 is configured to:

select one link alarm information report mode from the following three link alarm information report modes:

the link alarm information is reported to the REC through a data link layer transmission channel or data network layer transmission channel with a data checking function; or, the link alarm information is reported to the REC through a physical layer channel between the RE and the REC; or the link alarm information is reported to the REC through a superior RE cascaded with the RE.

The report mode selecting unit 62 includes:

a master port selecting unit for selecting a link alarm information report mode in which the link alarm information is reported to the REC through a data link layer transmission channel or data network layer transmission channel with a data checking function in case that the source of the link alarm information is the master port of the RE or an inferior RE cascaded with the RE; and a slave port selecting unit for selecting a link alarm information report mode in which the link alarm information is reported to the REC through a superior RE cascaded with the RE or through a physical layer channel between the RE and the REC in case that the source of the link alarm information is the slave port of the RE.

The alarm reporting unit 63 includes a first reporting unit and/or a second reporting unit, wherein the first reporting unit is configured to send the link alarm information to the master port of a superior RE cascaded with the RE to instruct the master port of the superior RE to report, after receiving the link alarm information, the link alarm information to the REC through a data link layer transmission channel or data network layer transmission channel with a data checking function;

and the second reporting unit is configured to send the link alarm information to the data link layer transmission channel or data network layer transmission channel so as to instruct the data link layer transmission channel or data network layer transmission channel to perform a CRC on the received link alarm information and send the processed link alarm information to the REC.

The first reporting unit is configured to:

carry the link alarm information in a control word defined by a CPRI and send the control word to the master port of a superior RE cascaded with the RE so as to instruct the master port of the superior RE to obtain, after receiving the control ward, the link alarm information from the control ward by analyzing the control ward.

In sum, the disclosure has the following beneficial effects:

in the solution provided in an embodiment of the disclosure, after receiving link alarm information, an RE determines the source of the link alarm information, selects one link alarm information report mode from multiple predetermined link alarm information report modes according to the result of determining the source, and reports the link alarm information to an REC according to the selected link alarm information report mode. It can be seen that instead of reporting all link alarm information to the REC through a physical layer channel, the RE can select multiple report modes to report, after receiving the link alarm information, the link alarm information to the REC, therefore, the number of alarm information to be detected by the REC on a physical layer can be effectively decreased, thus the resource waste and processing complexity of the REC is reduced; besides, the link alarm information can be reported in different modes, which significantly lowers the correlation between alarm information and consequentially reduces the probability of an error alarm.

In the solution provided in the embodiment of the disclosure, an REC or RE only need to detect and report the alarms reported by the master port and an inferior slave port thereof no matter how many cascades there are, therefore, the work of alarm detection on the REC side is greatly simplified, as the alarm of a RE when cascaded is only related to an superior equipment, the processing on the correlation of alarms is remarkably simplified. Still taking an REC supportive to 10 ports as an example, if each port supports 16-cascade cascaded equipments at most, then in this solution, the alarm information the REC needs to process are totally 10*n (n represents the number of the alarms each port of equipment of each cascade needs to report), only accounting for $\frac{1}{32}$ of that of the existing centralized report solution, therefore, the resources being used is greatly decreased. In addition, due to the use of existing CRC and retransmission function in case of an error, processing alarm reporting through the HDLC or Ethernet makes the alarm information reported more reliable.

Apparently, various modifications and variations can be devised by those skilled in this art without departing from the spirit and scope of the disclosure. Thus, it is intended that the disclosure covers the modifications and variations within the scope of the appended claims and their equivalents.

The invention claimed is:

1. An alarm report method for cascaded equipments, comprising:

determining, by an RE, a source of link alarm information after the RE receives the link alarm information;

selecting, by the RE, one link alarm information report mode from multiple predetermined link alarm information report modes according to a result of determining the source; and reporting, by the RE, the link alarm information to an REC according to the selected link alarm information report mode;

wherein the multiple link alarm information report modes comprise:

reporting, by the RE, the link alarm information to the REC through a data link layer transmission channel or data network layer transmission channel with a data checking function; or reporting, by the RE, the link alarm information to the REC through a physical layer channel between the RE and the REC; or reporting, by the RE, the link alarm information to the REC through a superior RE cascaded with the RE; and wherein the reporting, by the RE, the link alarm information to the REC through a superior RE cascaded with the RE comprises:

sending, by the RE, the link alarm information to the master port of the superior RE cascaded with the RE;

reporting, after receiving the link alarm information by the master port of the superior RE, the link alarm information to the REC through the data link layer transmission channel or data network layer transmission channel with a data checking function; and wherein the sending, by the RE, the link alarm information to the master port of the superior RE cascaded with the RE comprises:

carrying, by the RE, the link alarm information in a control word defined by a CPRI and sending the control word to the master port of the superior RE cascaded with the RE; and receiving, by the master port of the superior RE, the link alarm information comprises:

obtaining, after receiving the control word by the master port of the superior RE, the link alarm information from the control word by analyzing the control word.

2. The method according to claim 1, wherein the process that the RE selects the link alarm information report mode comprises:

selecting a link alarm information report mode in which the link alarm information is reported to the REC through a data link layer transmission channel or data network layer transmission channel with a data checking function in case that the source of the link alarm information is a master port of the RE or an inferior RE cascaded with the RE; or selecting a link alarm information report mode in which the link alarm information is reported to the REC through the superior RE cascaded with the RE or through the physical layer channel between the RE and the REC in case that the source of the link alarm information is a slave port of the RE.

3. The method according to claim 1, wherein the reporting, by the RE, the link alarm information to the REC through a data link layer transmission channel or data network layer transmission channel with a data checking function comprises:

sending, by the RE, the link alarm information to the data link layer transmission channel or data network layer transmission channel;

performing, by the data link layer transmission channel or data network layer transmission channel, a CRC on the received link alarm information and sending the processed link alarm information to the REC;

performing, after receiving the link alarm information, a CRC on the link alarm information by the REC, and reporting the link alarm information to an Operation Maintenance Center (OMC) in case that the check is succeeded.

4. The method according to claim 1, wherein the data link layer transmission channel comprises a High-speed Data Link Control (HDLG) channel; and the data network layer transmission channel comprises an Ethernet channel.

5. An alarm report system for cascaded equipments, comprising an RE and an REC, wherein the RE cascaded with the REC is configured to determine a source of link alarm information after receiving the link alarm information, select one link alarm information report mode from multiple predetermined link alarm information report modes according to a result of determining the source, and report the link alarm information to the REC according to the selected link alarm information report mode; and wherein the RE is configured to, when selecting one link alarm information report mode from multiple predetermined link alarm information report modes, select a link alarm information report mode in which the link alarm information is reported to the REC through a data link layer transmission channel or data network layer transmission channel with a data checking function in case that the source of the link alarm information is a master port of the RE or an inferior RE cascaded with the RE; and select a link alarm information report mode in which the link alarm information is reported to the REC through a superior RE cascaded with the RE or through a physical layer channel between the RE and the REC in case that the source of the link alarm information is a slave port of the RE.

6. The system according to claim 5, when selecting the link alarm information report mode in which the link alarm information is reported to the REC through the superior RE cascaded with the RE, the RE is configured to:

send the link alarm information to the master port of the superior RE cascaded with the RE;

the superior RE is configured to:

report, after receiving the link alarm information through the master port of the superior RE, the link alarm information to the REC through the data link layer transmission channel or data network layer transmission channel with a data checking function.

7. The system according to claim 5, wherein when the link alarm information is reported to the REC through the data link layer transmission channel or data network layer transmission channel with a data checking function, the RE is configured to:

send the link alarm information to the data link layer transmission channel or data network layer transmission channel;

the data link layer transmission channel or data network layer transmission channel is configured to:

perform a CRC on the received link alarm information and send the processed link alarm information to the REC;

and the REC is configured to:

perform, after receiving the link alarm information, a CRC on the link alarm information, and report the link alarm information to an OMC if the check is succeeded, or discard the link alarm information if the check is failed.

8. A radio equipment, comprising:

an alarm receiving unit, which is configured to receive link alarm information;

a source determining unit, which is configured to determine a source of the link alarm information;

a report mode selecting unit, which is configured to select one link alarm information report mode from multiple predetermined link alarm information report modes according to a result of determining the source; and an alarm reporting unit, which is configured to report the link alarm information to an REC according to the link alarm information report mode selected by the report mode selecting unit;

wherein the report mode selecting unit comprises:

a master port selecting unit, configured to select a link alarm information report mode in which the link alarm information is reported to the REC through a data link layer transmission channel or data network layer transmission channel with a data checking function in case that the source of the link alarm information is a master port of the RE or an inferior RE cascaded with the RE; and a slave port selecting unit, configured to select a link alarm information report mode in which the link alarm information is reported to the REC through a superior RE cascaded with the RE or through a physical layer channel between the RE and the REC in case that the source of the link alarm information is a slave port of the RE.

9. The radio equipment according to claim 8, wherein the alarm reporting unit comprises a first reporting unit and/or a second reporting unit, wherein the first reporting unit is configured to send the link alarm information to the master port of the superior RE cascaded with the RE through physical link layer transmission channel or data network layer transmission channel so as to instruct the master port of the superior RE to report the link alarm information to the REC through the data link layer transmission channel or data network layer transmission channel with a data checking function after receiving the link alarm information; and the second reporting unit is configured to send the link alarm information to the data link layer transmission channel or data network layer transmission channel so as to instruct the data link layer transmission channel or data network layer transmission channel to perform a CRC on the received link alarm information and send the processed link alarm information to the REC.

10. The method according to claim 2, wherein the data link layer transmission channel comprises a High-speed Data Link Control (HDLC) channel; and the data network layer transmission channel comprises an Ethernet channel.

11. The method according to claim 1, wherein the data link layer transmission channel comprises a High-speed Data Link Control (HDLC) channel; and the data network layer transmission channel comprises an Ethernet channel.

12. The method according to claim 3, wherein the data link layer transmission channel comprises a High-speed Data Link Control (HDLC) channel; and the data network layer transmission channel comprises an Ethernet channel.

13. The method according to claim 1, wherein the data link layer transmission channel comprises a High-speed Data Link Control (HDLC) channel; and the data network layer transmission channel comprises an Ethernet channel.

14. The system according to claim 6, wherein when the link alarm information is reported to the REC through the data link layer transmission channel or data network layer transmission channel with a data checking function, the RE is configured to:

send the link alarm information to the data link layer transmission channel or data network layer transmission channel;

the data link layer transmission channel or data network layer transmission channel is configured to:

perform a CRC on the received link alarm information and send the processed link alarm information to the REC;

and the REC is configured to:

perform, after receiving the link alarm information, a CRC on the link alarm information, and report the link alarm information to an OMC if the check is succeeded, or discard the link alarm information if the check is failed.

* * * * *

UNITED STATES PATENT AND TRADEMARK OFFICE
CERTIFICATE OF CORRECTION

PATENT NO. : 8,692,664 B2  
APPLICATION NO. : 13/258210  
DATED : April 8, 2014  
INVENTOR(S) : Panke Zhang Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 26 days.

Signed and Sealed this

Twenty-ninth Day of September, 2015

Michelle K. Lee
*Director of the United States Patent and Trademark Office*